United States Patent
Mrvaljevic

(10) Patent No.: US 9,807,631 B2
(45) Date of Patent: Oct. 31, 2017

(54) WIRELESS TRANSMITTER NETWORK ANALYSIS TOOL

(71) Applicant: Fluke Corporation, Everett, WA (US)

(72) Inventor: Nikola Mrvaljevic, Seattle, WA (US)

(73) Assignee: Fluke Corporation, Everett, WA (US)

( * ) Notice: Subject to any disclaimer, the term of this patent is extended or adjusted under 35 U.S.C. 154(b) by 30 days.

(21) Appl. No.: 14/079,583

(22) Filed: Nov. 13, 2013

(65) Prior Publication Data

US 2015/0133062 A1　May 14, 2015

(51) Int. Cl.
　　*H04W 24/08*　　(2009.01)
　　*H04L 1/00*　　(2006.01)
　　*H04W 24/00*　　(2009.01)

(52) U.S. Cl.
　　CPC .............. *H04W 24/08* (2013.01); *H04L 1/00* (2013.01); *H04W 24/00* (2013.01)

(58) Field of Classification Search
None
See application file for complete search history.

(56) References Cited

U.S. PATENT DOCUMENTS

| | | | | |
|---|---|---|---|---|
| 4,122,432 A * | 10/1978 | Triebold | ................. | G01H 3/08 367/135 |
| 7,844,690 B1 * | 11/2010 | Durham | .............. | H04L 12/4625 709/220 |
| 2007/0139183 A1 | 6/2007 | Kates | | |
| 2007/0293232 A1 | 12/2007 | Nonaka | | |
| 2009/0052500 A1 * | 2/2009 | Bush | .................... | H04B 1/0092 375/145 |
| 2010/0020707 A1 * | 1/2010 | Woodings | ............. | H04L 43/045 370/252 |
| 2011/0103242 A1 * | 5/2011 | Hittel | .................... | H04W 24/08 370/252 |
| 2012/0245893 A1 * | 9/2012 | D'Angelo | ........ | G05B 19/41875 702/182 |
| 2013/0310090 A1 * | 11/2013 | Bevan | .................. | H04B 1/1027 455/501 |
| 2014/0324389 A1 * | 10/2014 | Baldwin | ................ | G01D 9/005 702/187 |

FOREIGN PATENT DOCUMENTS

WO　　2009/024925 A2　　2/2009

OTHER PUBLICATIONS

"Fluke Networks AirCheck™ Wi-Fi Tester Getting Started Guide," Fluke Corporation, Everett, Wash., Dec. 2009.

(Continued)

*Primary Examiner* — Ankur Jain
*Assistant Examiner* — Zhitong Chen
(74) *Attorney, Agent, or Firm* — Seed IP Law Group LLP

(57) ABSTRACT

A handheld wireless transmitter network analysis tool has a transceiver for detecting wireless signals from a transceiver of a smart device used in an automated process control. The tool has a processor with program modules for analyzing the spectrum of received wireless signals and noise. Another memory module includes a device description protocol program for reading tag and primary variable data carried by the wireless signals from smart device. The network tool displays the frequency and spectrum of the wireless signal from smart device, the tag and primary variables for device, the signal to noise ratio and the possible identity of the sources of noise.

8 Claims, 3 Drawing Sheets

(56) References Cited

OTHER PUBLICATIONS

Extended European Search Report dated Apr. 30, 2015, for corresponding EP Application No. 14192973.7-1854/2876920, 9 pages.
Ströver, "Kurztest: Fluke AirCheck zur Überprüfung von WLAN-Netzen," NTZ (Nachrichtentechnische Zeitschrift), VDE Verlag Gmbh, DE, vol. 64, No. 5, Sep. 2011, p. 47, XP001564546, 1 page.

* cited by examiner

WIRELESS TRANSMITTER NETWORK ANALYSIS TOOL

BACKGROUND

In process plants, most new field instruments that sense or control parameters for processing chemicals and pharmaceuticals are smart devices. A smart device is microprocessor-based, has extra functionality and digital compensation, and supports multiple sensor types or multiple variables. The smart device includes one or more transducers that sense real-world parameters such as temperature, pressure, flow or position and output electrical signals representative of the sensed values.

A smart device communicates with other devices, such as communicators and calibrators using one or more industry accepted standard protocols such as HART, an acronym for Highway Addressable Remote Transducer, or Fieldbus. HART is an industry standard for a hybrid protocol that enables communications between smart field devices and a control system that employs legacy 4-20 mA wiring. Foundation Fieldbus is another all-digital protocol. These and other protocols use device descriptions that are stored in the smart device. The protocols enable process plant managers to mix instruments of different manufacturers.

Smart devices hold one or more blocks or functional units. A functional unit has an input, an output, or a control function. Each block has one or more parameters associated therewith. A parameter is an attribute which characterizes, affects, or is otherwise related to a block or a device. Exemplary parameters include the kind of block or kind of device, the maximum operating or measurement range of a block or a device, the mode of a block or a device, the value of a block or a device measurement, etc. In addition, parameters have one or more properties, such as the name of the parameter (e.g., temperature), the value of the property (e.g., measured temperature), and the property of units involved in the measurement (e.g., degrees Fahrenheit or centigrade).

Each smart device has a computer memory that holds a Device Description (DD). The DD includes information about the smart device and is also a device driver computer program for operating the smart device. Device Descriptions (DDs) provide the information needed by a communicator, calibrator, host application, or control system to properly access and display important device information located in smart devices. The DD includes all of the information needed to fully communicate with the communicator and all parametric information about the smart device. For example, the DD contains information about the smart device including its tag (an arbitrary name and location assigned to the instrument), basic parameters it monitors such as its primary variable (temperature, pressure, flow, position, etc.), and secondary and tertiary parameters and other preferred parameters of interest and importance to processing control. The communicator or calibrator reads the DD and uses the DD to navigate through the smart device to gather information including the tag (name/location) of the device, its primary variable, primary parameters, and secondary or tertiary parameters or other preferred parameters.

Many smart devices are equipped with wireless transceivers in addition to conventional wired communication ports. When processing plants and facilities expand or are otherwise remodeled, it is common to use wireless smart devices for communicating with a communication center. It is often less expensive and quicker to establish a wireless network.

Wireless communications systems, in combination with a communication center and smart devices, allow operators of complex processes to set up, change, monitor, and automate complex processes. Each smart device may be individually controlled by commands issued from the communication center. That center synchronizes the operations and communications of all smart devices in the network. The smart devices are synchronized to report their status at set times during a broadcast portion of a communication cycle. The communications cycle leaves open one or more time slots for acyclic communication between the individual devices and the communication center. The communication network also provides for interruptions of synchronous transmissions for alarms sent by a smart device to indicate a potentially dangerous condition. If the communication center does not receive an expected status signal from a smart device, the communication center may attempt to directly communicate with the non-transmitting device.

When the communication center fails to receive an expected status signal, such failure does not always mean the smart device is not functioning. It is possible that electromagnetic noise in the vicinity of the smart device is interfering with its communication to its access point. Alternatively, one or more access points or nodes for relaying the status of the smart device may have failed. Nevertheless, it would be dangerous to continue to operate a process without knowledge and control of the smart devices, especially those that are critical to safe operation. In such cases, a technician may be dispatched to inspect the smart device and to determine whether it is working or there is a network communication problem. If inspection of the smart device indicates it is operating as expected, the process may continue. Accordingly there is a need for a tool to analyze the wireless network and check the wireless output of a smart device at the locale of the smart device.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A handheld wireless transmitter network analysis tool has a receiver for receiving a wireless signal that carries a tag contained in the device description (DD) of a smart device and primary variable information generated and broadcast by a smart device to one or more access points of a wireless network. The tool also has analog-to-digital conversion circuitry for converting wireless signals and noise signals into digital data representative of the information carried by the wireless signal, the frequency and magnitude of the wireless signal, and the frequencies and magnitude of the noise. The tool has auxiliary analog-to-digital circuitry or may have a digital signal processor with built-in analog-to-digital circuitry. Other electronic components include a memory for holding digital data converted by the analog-to-digital circuitry, a spectrum program, and protocol programs.

The spectrum program analyzes digital signal data to determine the spectrum of the signals. A typical spectrum program performs a discrete Fourier transform process to sample wireless signals and provides the frequency and magnitude of the carrier signal of a transceiver. The spectrum program also analyzes noise to provide frequency and magnitude data and to identify types of equipment likely responsible for the noise. The protocol programs enable the processor to read and display tag and primary variable information carried by the wireless signal. The programs in the memory are run on a processor in accordance with the steps of each program and any inputs received from a technician operating the tool. The results of the processed programs are displayed to show the frequency and magnitude of the wireless signal, the tag and primary variable information carried by the wireless signal, the frequencies and magnitudes of the noise signals, and the possible sources of the noise.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
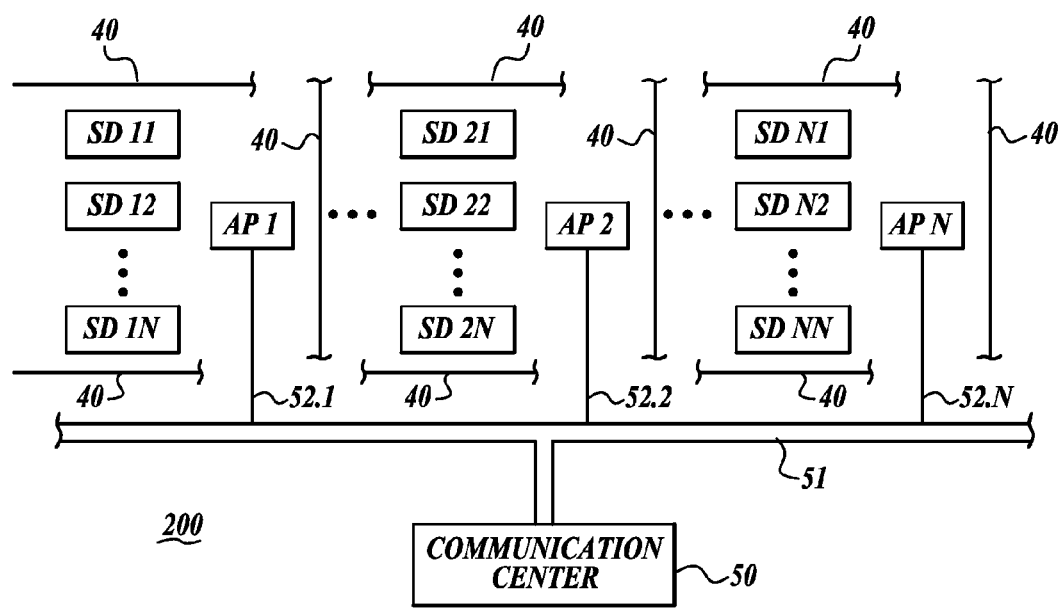
FIG. 1 is a schematic view of a process communications network.

Turning to FIG. 1, a process communication network 200 has a communication center 50 for receiving and transmitting information to numerous smart devices. The smart devices may be located throughout a process facility that may occupy a portion of one floor of a building, an entire floor, multiple floors, and/or multiple buildings. The number of smart devices in a process facility may number in the hundreds or thousands. It is common to have one or more barriers 40 (wall, ceilings, floors) that prevent wireless transmissions from entering or leaving one or more locales L1, L2, LN. In each locale there are a number of smart devices, such as SD11, SD12, and SD1N in locale L1. In each locale there are one or more access points, such as AP1 in locale L1. The access points are connected via a suitable communications cable, such as cable 52.1, to the communication center 50. Transmissions from smart devices in the locales are received by access points and sent via communication cables 52.N to the communication center 50. Transmissions from the communication center 50 to any one of the smart devices SD, NN are sent via the communications cables 52.N to the intended smart devices. Those skilled in the art understand that such a network 200 may include one or more routers, hubs, bridges, and other networking equipment to establish and maintain communications between the individual smart devices and the communication center 50. Communications over the network 200 occur in accordance with one or more industry standard protocols, such as HART, Fieldbus, or other protocols accepted by the processing industry, and with IEEE standard 802.11 for wi-fi communication.

Figure 2A:
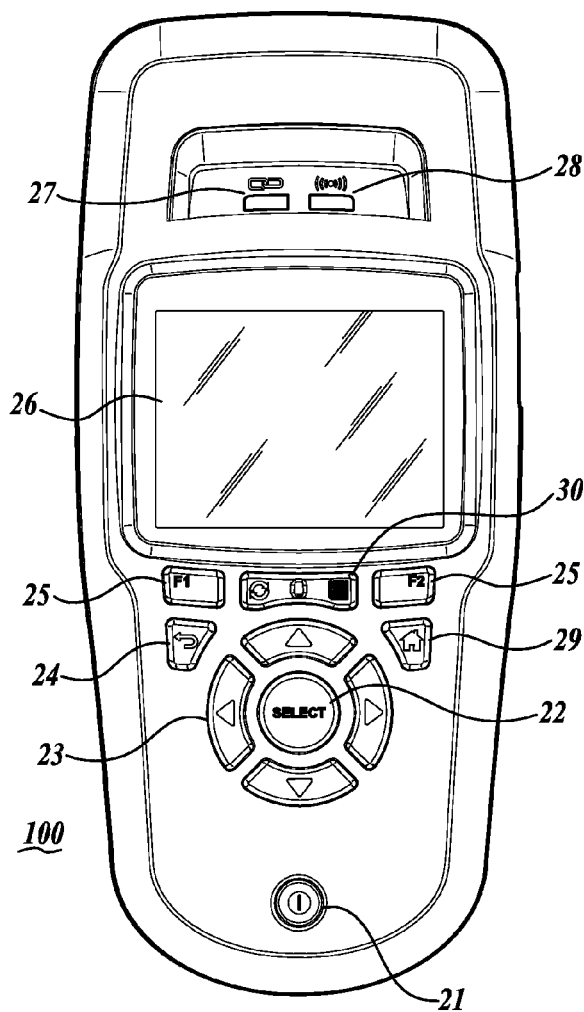
FIGS. 2A and 2B show the front and rear of a wireless network analysis tool.
Figure 2B:
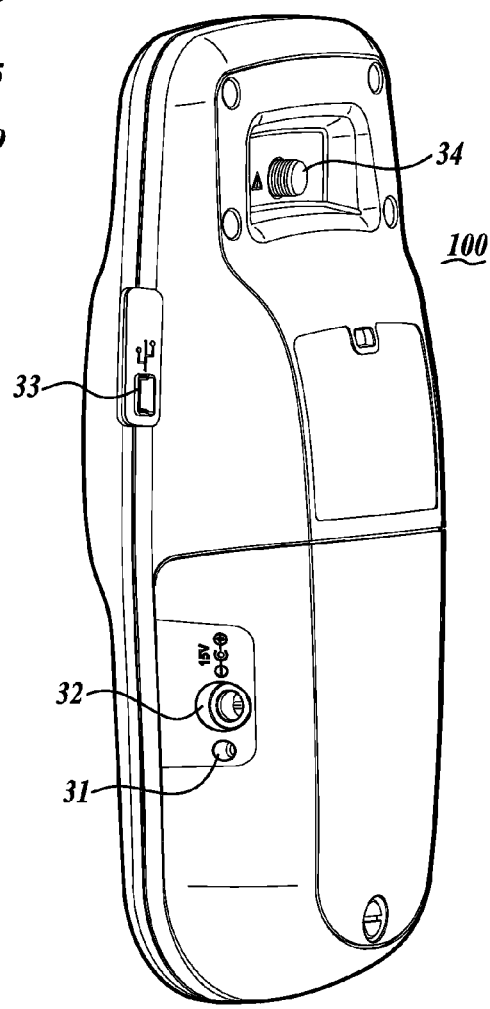

Turning to FIGS. 2A and 2B, they show a handheld wireless transmitter network analysis tool 100. The front of network tool 100 has a full color display 26, a number of input keys and one or more light emitting diodes (LEDs) for signaling a technician using the network tool 100. Key 21 is an on/off key. Key 22 allows a user to make a selection shown on the display 26. Keys 23 are navigation keys. Key 24 shows the previous screen. Keys 25 are softkeys and their respective functions are displayed above the keys in the display 26. An LED 27 blinks when the network tool 100 tries to connect to a wireless local area network (LAN) and is steady when the network tool 100 is connected to a wireless LAN. LED 28 blinks when the network tool 100 transmits data. Key 29 returns the display 26 to a home screen. Key 30 is a rocker switch. Pressing on its left side erases all data collected during the current sequence of tests. This does not erase the results saved in memory. Pressing on its right side saves all data in a session file. LED 31 turns on when the network tool 100 is connected to an AC adapter. LED 32 is red when the battery charges and green when the battery is fully charged. USB port 33 connects the network tool 100 to a personal computer. Jack 34 is a connector for accepting an auxiliary antenna, when needed.

Figure 3:
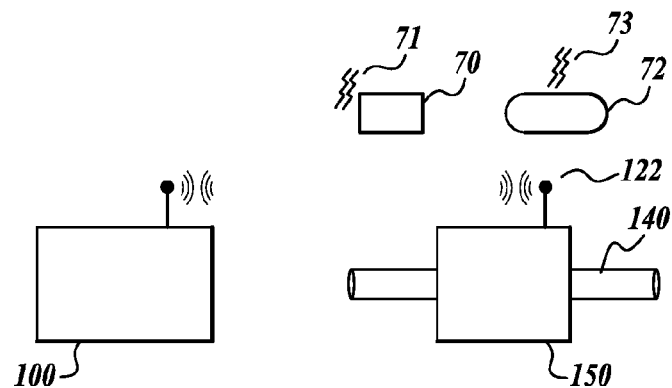
FIG. 3 is a schematic representation of a wireless network analysis tool proximate a smart device.

Referring to FIG. 3, a network tool 100 is carried by a technician to the locale L1 of a typical smart device 150. That device may include a transducer for monitoring pressure, temperature, flow, level or other parameters of a fluid in conduit 140. The Smart device 150 has a source of electrical energy (not shown) that provides power for operating its electrical components including a processor 153, transducers T1, T2 (156, 157) (see FIG. 4) and a transceiver 122. The smart device 150 may be located proximate one or more sources of electromagnetic interference (noise), including a DC motor 70 which emits one type of noise 71 and an electrical transformer 72 which emits a different type of noise 73.

Figure 4:
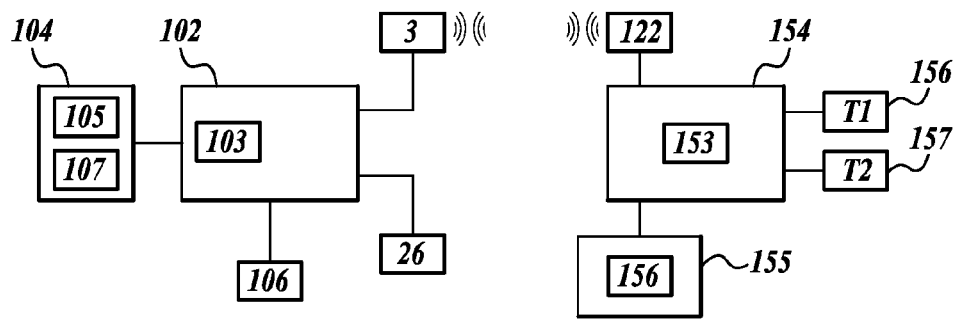
FIG. 4 is a schematic representation of the electrical and electronic components of a wireless network analysis tool proximate a smart device.

Referring to FIG. 4, the network tool 100 has a controller 102 which includes a processor 103 and a transceiver 3 for receiving input signals from the smart device transceiver 122. The processor 103 may be microprocessor or a digital signal processor. If the processor 103 is a microprocessor, then the signals representative of the output of the smart device 150 are converted from analog into digital signals by other suitable circuitry well known to those skilled in the art. As an alternative, the processor 103 may be a digital signal processor and have built-in analog-to-digital conversion circuitry. In both cases, the processor 103 is capable of arithmetic logic operations and of executing instructions of one or more programs. Operator input device 106 represents the input, navigation and softkeys described above in connection with FIG. 2. The network tool 100 has a memory system 104 and a display 26.

Depending on the particular configuration and type of network tool 100, the memory system 104 may include system memory in the form of volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to, and/or currently being operated on, by the processor 103. In this regard, the processor 103 serves as a computational center of the network tool 100 by supporting the execution of program instructions.

The memory system 104 may be any volatile or nonvolatile, removable or non-removable memory, implemented using any technology capable of storing information. The information stored in the memory system 104 may include, but is not limited to, program modules and data to be accessed by the processor 103. Generally, program modules may include routines, applications, objects, components, data structures, etc., that perform particular tasks or implement particular abstract data types. It will be appreciated that system memory and other memories described herein are merely examples of various computer-readable memory media.

The memory system 104 may be configured to hold a spectrum program 105. The spectrum program 105 is operable by the processor and circuitry in the processor or ancillary circuitry to separate a carrier wave from information carried by the carrier wave. The information carried by the carrier wave is the tag and primary variable information of the smart device 150. The carrier wave is converted into digital data by applying a discrete Fourier transform process to sample the signals received by the network tool 100 over a finite period of time. Such programs are well known to those skilled in the art. They output data showing the frequencies and magnitudes of the detected signals. Noise from electrical equipment is often detected as a broad spectrum signal of relatively constant magnitude.

The memory system 104 may also be configured to store information received by wireless transceiver 3. When information is received in the memory system 104, the processor 103 may be configured to execute instructions to directly display the information received from the received information and the operating and application programs. The memory system 104 holds a device description communications protocol 107, such as HART, Fieldbus, or other protocol communications interface protocol, for receiving and displaying primary value data broadcast by the wireless transceiver 122 of the smart device 150.

The smart device 150 has a controller 154 which includes a processor 153 for receiving input information from the wireless transceiver 122. The smart device 150 may also have input jacks (not shown) for communicating with other devices, such as calibrators and communicators. Depending on the particular configuration and type of device 150, the memory system 155 may include system memory in the form of volatile or nonvolatile memory, such as read only memory ("ROM"), random access memory ("RAM"), EEPROM, flash memory, or other memory technology. Those of ordinary skill in the art and others will recognize that system memory typically stores data and/or program modules that are immediately accessible to, and/or currently being operated on by, the processor 153. In this regard, the processor 153 serves as a computational center of the smart device 150 by supporting the execution of program instructions.

The memory system 155 may be any volatile or nonvolatile, removable or non-removable memory, implemented using any technology capable of storing information. The information stored in the memory system 155 may include, but is not limited to, program modules and data to be accessed by the processor 153. Generally, program modules may include routines, applications, objects, components, data structures, etc., that perform particular tasks or implement particular abstract data types. It will be appreciated that system memory and other memories described herein are merely examples of various computer-readable memory media. In particular, the smart device has a memory section or module 155 which includes the entire DD for the smart device 150, including its HART, Fieldbus, or other protocol communications interface program.

The memory system 155 is configured to store information received from a communication center 50, a calibrator, or communicator through the I/O terminals (not shown) or wireless transceiver 122. When information is received in the memory system 155, the processor 153 may be configured to execute instructions to directly display the information received from the received information and the operating and application programs.

A wireless data link layer combines an automation protocol (HART, Foundation Fieldbus, etc.) and IEEE 802.11 standards to satisfy the requirements of the process tasks. IEEE 802.11 is a standard for local area networks employing wireless communications (also known as wi-fi) which is widely implemented in personal computer networks. The network tool 100 can analyze a network using the IEEE 802.11 standard.

There are a number of commercial devices for wi-fi testing which detect, analyze and test devices operating under the IEEE802.11 standard and any one of them may be converted into a wireless transmitter network analysis tool by suitable modification as hereinafter explained. One such wi-fi tester is the AirCheck™ Wi-Fi tester manufactured by Fluke Corporation, assignee of this patent. That device includes a spectrum analyzer which examines frequencies, magnitudes of signals in each frequency, the usage of channels, and locates sources of connection problems. The AirCheck™ tester operates on 802.11 b/g/n networks in the 2.4 GHz band and 802.11 a/n networks in the 5 GHz band. The letters a, b, g, and n following the designation 802.11 are subsets of the 802.11 general standard. The AirCheck™ tester and other comparable testers are converted into handheld wireless transmitter network analysis tools 100 by adding one or more communication protocols 105 to the memory system 104 to enable the processor 103 and the transceiver 3 to receive the tag and primary variables transmitted over the HART, Fieldbus, or other automation protocol.

Figure 5:
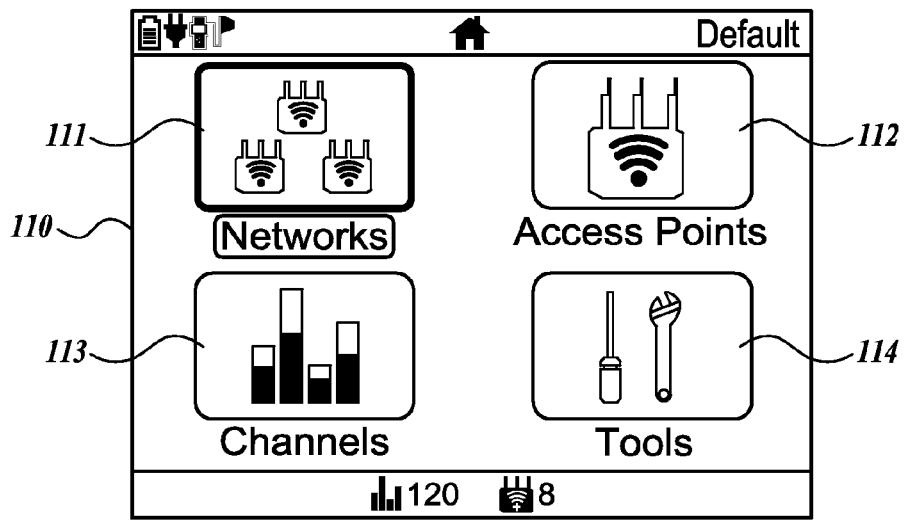
FIG. 5 is a view of a main screen of the display of the wireless network analysis tool.

Turning to FIG. 5, the display 26 of the network tool 100 has a main screen 110 with four submenus 111-114 for networks, access points, channels, and tools, respectively. A process facility may have one or more networks. A technician navigates to a particular smart device 150 by selecting the network menu 111 using the navigation and select keys on the front of the network tool 100. Once in a network, the technician may select the particular access point by selecting the access submenu 112. That menu displays a list of access points for the network 200 and the signal strength of each identified access points. The technician may select a particular access point and the display 26 will show the signal strength, noise strength, and signal to noise ratio (SNR). For a given access point, the smart device 150 may be a particular channel and that channel is selected using menu 113, which will display the devices associated with each channel. When the technician is in proximity to the smart device 150, one or more tools that form the tool submenu 114 are selected to analyze the problem, if any, with the smart device 150.

The channel screen 113 will list the smart devices using a given channel. On the tools sub-menu 114 the technician may command the network tool 100 to list smart devices and the display will show a list of the smart devices. The tools sub-menu 114 is also used to take measurements of a target smart device 150. In a given session, the network tool 100 will measure the frequency of the transceiver 122, the strength of the wireless signal transmitted by the transceiver 122, the strength of noise in the vicinity of the smart device 150, the signal to noise ratio of the transceiver's wireless signal, analyze noise signals to identify the type of equipment generating the noise, identify the tag of the smart device 150, and read the primary variables transmitted by transceiver 122 of the smart device 150. When noise is detected, another sub-menu (not shown) will be used to analyze the noise signal and identify its source, such as AC or DC electrical equipment. The network tool 100 will also record the tag and primary variable information broadcast by the smart device 150.

The smart device 150 periodically transmits its tag and its primary variable data including a current value of the variable, its zero or lower limit and its upper limit. The smart device 150 has a pressure transducer for T1 (156), and periodically broadcasts its device tag, the current pressure, zero value, and upper limits. For example, the transducer T1 may output primary variables of 100 psi for the current value, 50 for the zero value and 150 for the upper limit. However, local noise or a faulty access point may have interrupted its status transmissions. A technician who is in range of the transmitter 122 uses the network tool 100 to sense the frequency, strength of signal, and fundamental tag and status information of the smart device 150. At the end of the inspection, the technician reports to the communication center 50 the status of the smart device 150 and the primary values broadcast by the smart device 150, if it is operating properly.

In operation, the technician closes the distance D between the network tool 100 and the smart device 150 while reading and operating the display 26 on the network tool 100. If the transmitter 122 of the smart device 150 is operating, the technician will detect the transmission via transceiver 3. More specifically, the display 26 will show the frequency, strength of signal, and some limited data regarding the tag and primary variable of the smart device 150. The tool will also display whether there is noise 71, 73 proximate the smart device 150 and analyze the noise to determine whether it is produced by a DC motor 70, a transformer 72, or other electrical equipment including, and not limited to, AC or DC generators, AC motors, switchgear, or high power transmission lines. The network tool 100 is also useful for testing and analyzing performance of access points.

While preferred embodiments of the invention have been shown and described, modifications and variations may be made thereto by those of ordinary skill in the art without departing from the spirit and scope of the present invention. In addition, it should be understood that aspects of the various embodiments may be interchanged either in whole or in part. Furthermore, those of ordinary skill in the art will appreciate that the foregoing description is by way of example only, and is not intended to be limitative of the invention as further described in the appended claims. Those skilled in the art understand that other and equivalent components and steps may be used to achieve substantially the same results in substantially the same way as described and claimed.

The embodiments of the invention in which an exclusive property or privilege is claimed are defined as follows:

1. A handheld wireless transmitter network analysis tool comprising:
   a tool for detecting network communication signals that are transmitted by wireless computer networks in accordance with a first protocol, wherein the tool is configured to analyze the network communication signals and identify one or more features of the wireless computer networks, and wherein simultaneously the tool is further configured to detect wireless signals from one or more smart devices monitoring a process in accordance with one or more second protocols that are different from the first protocol and extract monitored parameters carried by the wireless signals, the tool including:
   a receiver that receives a wireless signal originating at a locale proximate to the receiver, the wireless signal being in accordance with one of the one or more second protocols, and the wireless signal carrying a tag specifying a name or a location of a smart device and at least one monitored parameter generated by the smart device monitoring a process of equipment that is separate from the tool, wherein the at least one monitored parameter is a value indicative of at least one of pressure, temperature, flow, or fluid level of the process of the equipment, the receiver further receiving ambient noise signals at the locale of the smart device;
   circuitry that converts the received wireless signal and ambient noise signals into digital signals;
   a memory for holding digital data and one or more operating and application programs;
   a processor that operates said programs to generate data signals representative of the tag, the at least one monitored parameter, and the frequency and magnitude of the received wireless signal; and
   a display that shows the frequency and magnitude of the received wireless signal, the tag, and the at least one monitored parameter carried by the received wireless signal.

2. The handheld wireless transmitter network analysis tool of claim 1 wherein the circuitry comprises analog-to-digital conversion circuitry for converting the received wireless signal and the received noise signals into digital data representative of the information carried by the received wireless signal, the frequency and magnitude of the received wireless signal and the frequencies and magnitude of the received noise signals.

3. The handheld wireless transmitter network analysis tool of claim 2 wherein the memory receives and stores: (1) the digital data representative of the information carried by the received wireless signal, (2) the digital data representative of the frequency and magnitude of the received wireless signal, and (3) the digital data representative of the frequencies and magnitude of the received noise signals.

4. The handheld wireless transmitter network analysis tool of claim 1 wherein the memory holds a spectrum program for analyzing digital signal data to determine the spectrum of the received wireless signal and the spectrum of the received noise signals, and a device description protocol program for reading the tag and the at least one monitored parameter carried by the received wireless signal.

5. The handheld wireless transmitter network analysis tool of claim 4 wherein the processor executes the spectrum program and said device description protocol program to determine the frequency of the received wireless signal, the magnitude of the received wireless signal, the frequencies of the received noise signals, the magnitudes of the received noise signals, and the tag and the at least one monitored parameter carried by the received wireless signal.

6. The handheld wireless transmitter network analysis tool of claim 1 wherein the at least one monitored parameter is a temperature or pressure.

7. The handheld wireless transmitter network analysis tool of claim 1, said processor further operating said programs to analyze the received noise signals to determine a source of the noise signals.

8. The handheld wireless transmitter network analysis tool of claim 1, said processor further operating said programs to analyze the received noise signals to determine a type of equipment generating said noise signals.

* * * * *